United States Patent [19]

Baugh

[11] 4,082,002
[45] Apr. 4, 1978

[54] GAUGE FLANGE

[75] Inventor: Benton F. Baugh, Houston, Tex.

[73] Assignee: Vetco, Inc.

[21] Appl. No.: 774,852

[22] Filed: Mar. 7, 1977

[51] Int. Cl.² .............................................. G01L 7/00
[52] U.S. Cl. .................................................... 73/756
[58] Field of Search ................ 73/420, 406, 407, 411, 73/419; 137/238

[56] References Cited
U.S. PATENT DOCUMENTS 3,198,015  8/1965  Smith .................................. 73/420
3,943,760  3/1976  Allen .................................. 73/420

Primary Examiner—Donald O. Woodiel
Attorney, Agent, or Firm—Pravel, Wilson & Gambrell

[57] ABSTRACT

A gauge flange providing a means for mounting a gauge in communication with service pressure and having means for selectively closing off such fluid communication to isolate the gauge for removal and/or repair.

1 Claim, 2 Drawing Figures

U.S. Patent
April 4, 1978
4,082,002
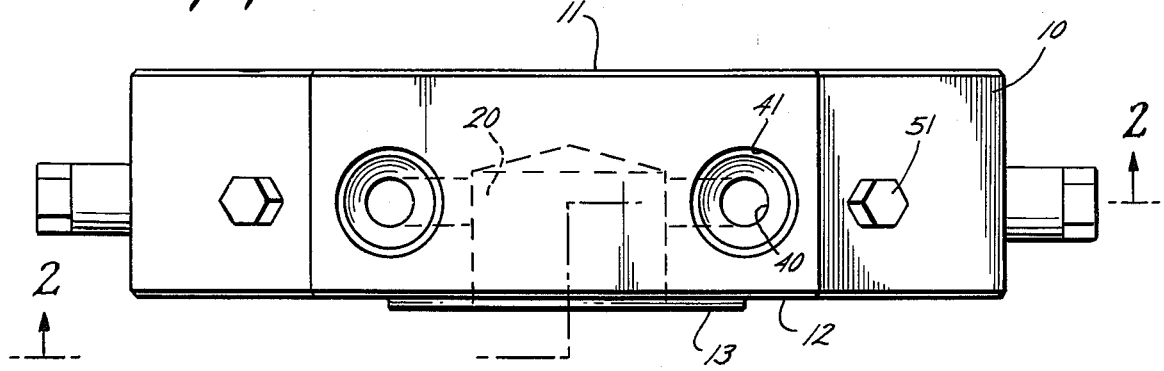
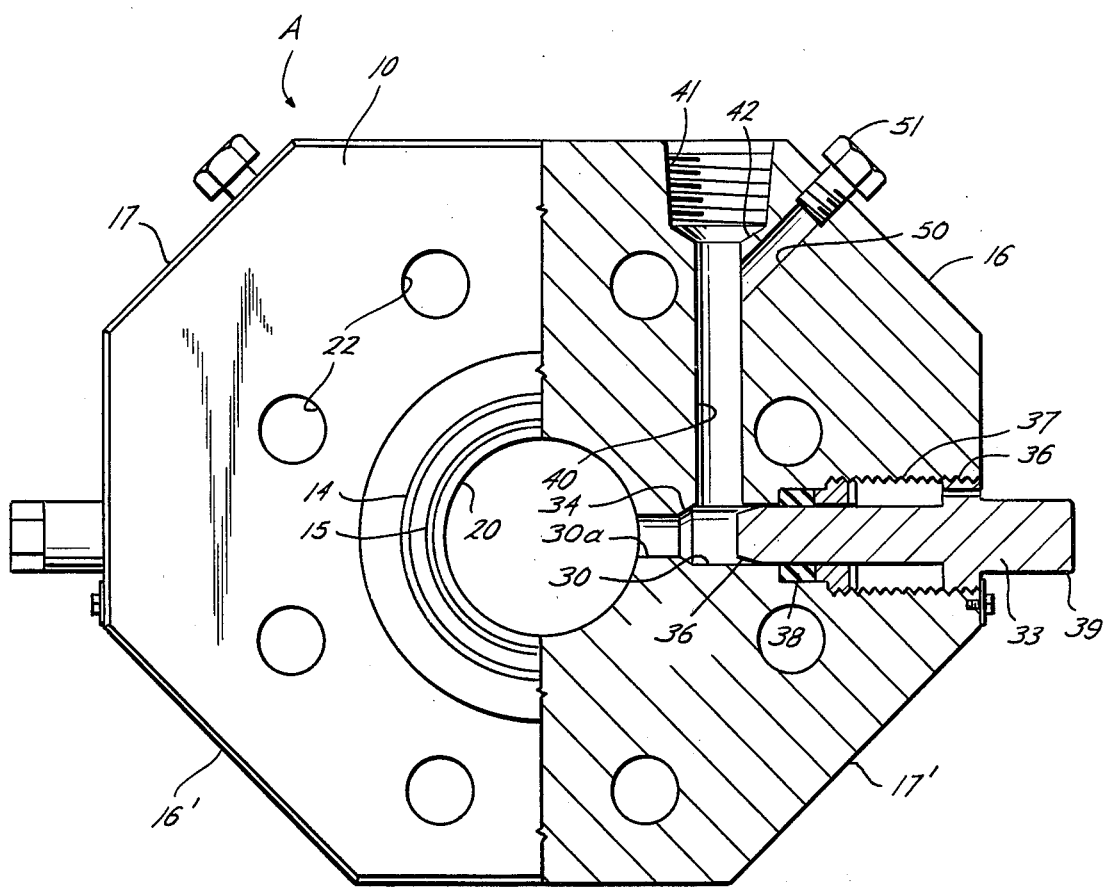

GAUGE FLANGE

BACKGROUND OF THE INVENTION

Heretofore when it has been desired to connect a gauge to a high pressure head or line, such as a manifold for handling oilwell drilling mud, it has been the practice to use a large bore high pressure tee, a high pressure valve and a split flange to mount the gauge in such a manner that it could be isolated from the high pressure fluid in the manifold. Various other manifold-type devices have been provided in the past, such as the stack-type gauge isolator valves which are used in hydraulic circuits for selectively gauging various circuits. These devices, however, merely read the take off and are of a structure which would be unsuitable for use with high pressure fluids, such as oilwell drilling mud, which would cause the devices to plug up and become inoperable and further, such devices have no provision for injecting grease or other anti-solidifying matter into the bore to prevent a plug up of the pressure gauge passage.

SUMMARY OF THE INVENTION

The present invention provides a new and improved apparatus for mounting a pressure gauge or pressure transducer for measuring and indicating the pressure in a high pressure manifold or line. Such apparatus comprises a flange, either a blind flange or a through flange, modified to mount a pressure gauge with a port in or through the flange, as the case may be. The pressure sensing and measuring device is connected in a passage which communicates with such port via a second passage containing a shut off valve which can be operated to open or close fluid communication to the pressure gauge thus enabling the gauge or transducer to be removed or repaired with interrupting flow through the high pressure line or manifold in which the pressure is bein monitored. Further, in the case of oilfield drilling mud or other high pressure fluid which may tend to gel or harden, an intermediate nonsolidifying matter, such as grease or the like, which does not contaminate the working fluid, may be used to charge the passage between the pressure gauge and the manifold to exclude the working fluid from the pressure gauge. A grease port is, therefore, provided which communicates with the pressure gauge channel passage and which provides access to the exterior of the flange for connecting suitable gauge fittings or other connections for applying the intermediate fluid to charge the pressure passage and thus isolate the gauge from the working fluid.

BRIEF DESCRIPTION OF THE DRAWINGS

FIG. 1 is a top view of the flange with internal passages shown in dotted lines; and FIG. 2 is a front elevation partly in section taken on line 2—2 of FIG. 1.

DETAILED DESCRIPTION OF THE PREFERRED EMBODIMENT

The gauge flange of the present invention is designated generally A in FIG. 1 of the drawings. Such flange comprises a housing 10 which is formed of a rectangular plate having parallel sides 11 and 12 and having a raised central portion 13 which is provided with O-ring seal grooves 14 and 15. As shown in FIG. 2, the corners of the rectangle are removed to form upper inclined shoulders 16 and 17 and the opposite lower corners 16' and 17' are cut at an angle so as to be substantially parallel to the opposite upper shoulder 16 and 17, respectively.

The central bore 20 is formed in the flange body 10 and, as shown in FIG. 1, which illustrates a blind flange, the bore extends from the outer side 12 to the terminal end 20a in the flange body 10. It will be appreciated that a through flange may be provided by extending the bore 20 all the way through the body from the side 11 to the side 12. In either event, the flange body 10 will also have a plurality of bolt holes 22 extending therethrough for connecting the flange to a pipe or vessel.

As shown in FIG. 2, a valve bore 30 extends from the outer side 31 to the central bore 20 to provide a passage for receiving a valve stem 33. The bore 30 has a smaller counterbore 30a formed near the central bore 20 and a tapered shoulder 34 connects the bore 30a in the counterbore 30. Such shoulder 34 provides a seat for receiving the tapered end 36 of the valve stem 33. The valve stem 33 has a longitudinally extending cylindrical body having a threaded shoulder 36 which is threadedly mounted in the threaded portion 37 of the valve passage 30. A packing gland 38 is also provided in the valve passage for sealing the valve stem in the valve bore. A hex head 39 is provided on the outer end of the valve steam for connecting a handle or other drive means for rotating the valve stem to move it radially inwardly and outwardly in the valve bore 30 to open and close fluid communication therethrough from the central bore 20.

A pressure gauge passage 40 is shown intersecting the valve stem bore 30 outboard of the valve seat 34 so that the valve stem 33 also opens and closes fluid communication through the passage 40 from the central bore 20. The outer end of the gauge passage 40 is provided with a threaded counterbore 41 and a tapered shoulder 42 which connects the bore 40 and the counterbore 41. Such threaded counterbore 41 is adapted to receive a connection for a pressure gauge or transducer (not shown) for sensing the pressure in the bore 20.

A lubricating passage 50 is also provided in the flange body 10. Such lubricating passage extends inwardly from the inclined shoulder 16 and intersects the gauge passage bore 40. Such lubricating passage 50 is provided for charging the gauge passage with a suitable anti-solidifying filler, such as grease or the like, which excludes the working fluid from the gauge passage 40. It will be appreciated that when the working pressure fluid is oilwell drilling mud which tends to gel and/or harden, it is desirable to exclude it from the pressure passage and thus avoid erroneous indications of pressure in the line or vessel.

A grease fitting 51 is provided at the outer end of the lubricating passage 50 for closing the end of the passage and providing a means for charging the lubricating passage and the pressure gauge passage 40 with a suitable filler.

It will be noted that the gauge flange shown in FIGS. 1 and 2 is a dual flange having duplicate sets of passage for receiving a second valve stem and a second gauge, if desired.

It will be appreciated that if the flange is a blind flange it will be connected to one end of a manifold or pipe for monitoring pressure therein whereas, if it should be a through flange, it can be inserted into a pipeline or in any flange connection with the standard fittings by simply unbolting the standard flange and placing the through gauge flange in line and reconnecting with slightly longer bolts.

With the valve stem 33 moved off of the seat 34, pressure from the bore 20 is communicated through the pressure passage 40 to the pressure gauge or transducer attached in the threaded counterbore 41. The valve stem can be moved along the bore 30 and the tapered face 36 seated in the tapered seat 34 to close off pressure from the bore 20. The pressure gauge can then be removed or repaired and the passage 50 and passage 40 may be charged with grease if desired. Also, it will be appreciated that with the valve stem 33 in the open position, that grease may be injected through the grease fitting into the pressure gauge passage and through the valve bore 30 and 30*a* and into the manifold to clean out any foreign matter, such as drilling mud, which may have accumulated in either of these passages.

The foregoing disclosure and description of the invention are illustrative and explanatory thereof, and various changes in the size, shape, and materials as well as in the details of the illustrated construction may be made without departing from the spirit and scope of the invention.

What is claimed is:

1. A gauge flange for mounting a pressure gauge in a pipeline or pressure vessel, comprising:
   a body having substantially parallel plane sides and having a central bore therein;
   means for connecting said flange to a pressure vessel or line;
   valve passage in said flange body communicating said central bore;
   valve seat in said valve passage;
   valve stem in said valve passage and adapted to be moved into and out of engagement with said valve seat to close and open communications through said valve passage;
   pressure gauge passage in said flange body communicating with said valve passage for connecting a pressure gauge thereto; and
   lubricant passage in the flange body communicating with said pressure gauge passage for injecting a lubricant into said pressure gauge passage to exclude the working fluid therefrom.

* * * * *